United States Patent [19]

Larkin

[11] 4,144,362
[45] Mar. 13, 1979

[54] METHOD FOR COATING GLASS USING MONOALKYLTIN TRIHALIDES

[75] Inventor: William A. Larkin, Morristown, N.J.

[73] Assignee: M&T Chemicals Inc., Stamford, Conn.

[21] Appl. No.: 872,766

[22] Filed: Jan. 27, 1978

Related U.S. Application Data

[63] Continuation-in-part of Ser. No. 507,074, Sep. 18, 1974, abandoned.

[51] Int. Cl.² .............................................. B05D 3/02
[52] U.S. Cl. .................................. 427/226; 427/255; 427/314; 427/345; 427/427; 65/60 D
[58] Field of Search .............. 427/345, 314, 226, 255, 427/110, 166, 427, 109, 168, 253; 65/60 D, 60 C

[56] References Cited

U.S. PATENT DOCUMENTS

| | | | |
|---|---|---|---|
| 2,567,331 | 9/1951 | Gaiser et al. | 427/110 |
| 2,614,944 | 10/1952 | Lytle | 427/110 |
| 3,414,429 | 12/1968 | Bruss et al. | 427/226 |
| 3,415,675 | 12/1968 | Allen | 427/345 |
| 3,498,825 | 3/1970 | Wiens | 427/421 |
| 3,615,327 | 10/1971 | McLary | 65/60 R |
| 3,754,012 | 8/1973 | Bulten | 260/429.7 |
| 3,853,612 | 12/1974 | Spanoudis | 65/60 C |
| 3,956,532 | 5/1976 | Russell | 427/314 |

FOREIGN PATENT DOCUMENTS

47-14592   1/1972   Japan ..................... 65/60 C

Primary Examiner—Michael F. Esposito
Assistant Examiner—Sadie L. Childs
Attorney, Agent, or Firm—Kenneth G. Wheeless; Robert Spector

[57] ABSTRACT

Finely divided or vaporized organic and inorganic tin compounds are conventionally applied to heated glass articles to produce a coating of stannic oxide on the article. Superior coatings are obtained when the tin compound is butyltin trichloride. This compound offers the additional advantage of being recoverable in substantially pure form.

2 Claims, 1 Drawing Figure

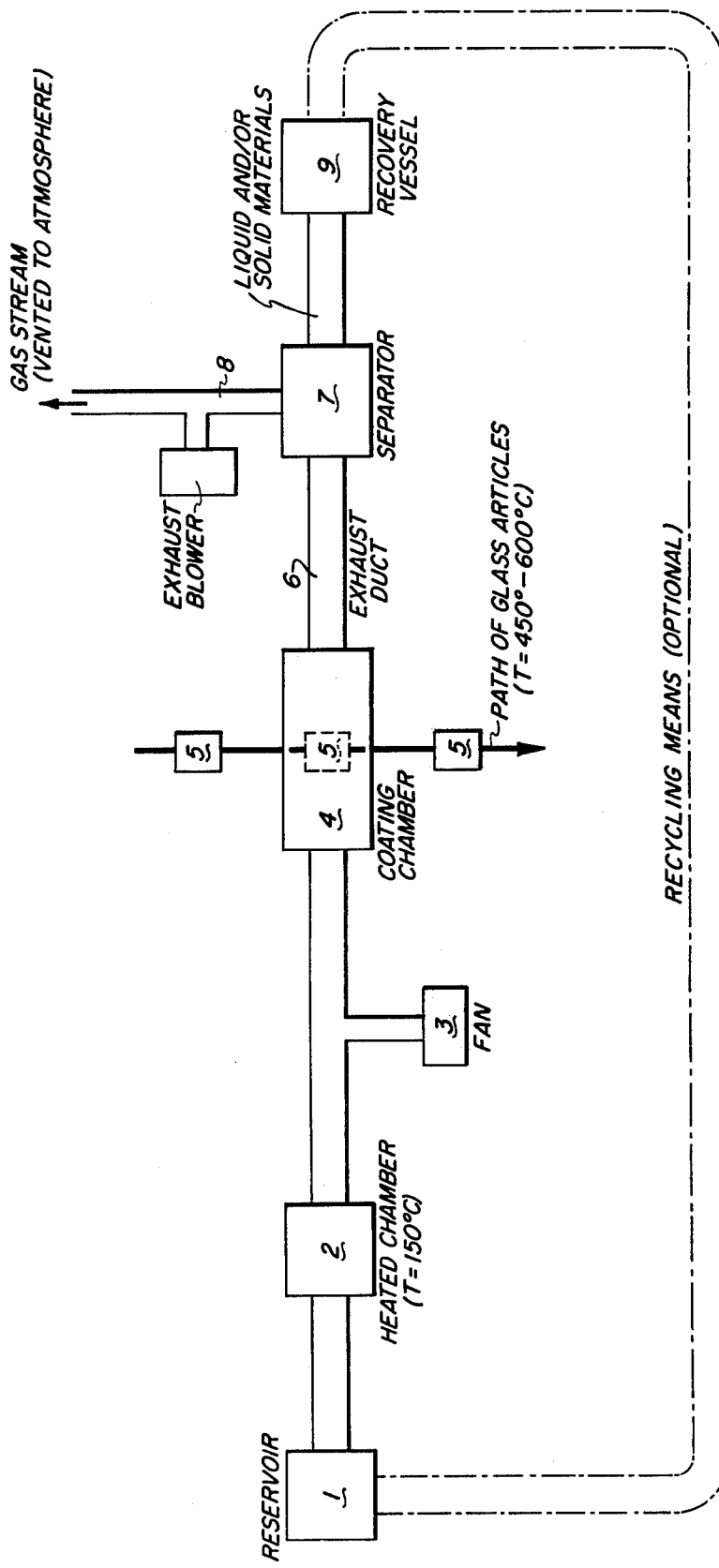

METHOD FOR COATING GLASS USING MONOALKYLTIN TRIHALIDES

BACKGROUND OF THE INVENTION

This application is a continuation-in-part of application Ser. No. 507,074, filed Sept. 18, 1974 and now abandoned.

This invention relates to an improved process for applying stannic oxide coatings to glass. This invention further relates to a process for obtaining stannic oxide coatings by applying an organotin compound to a heated glass surface, thereby converting the compound to stannic oxide, subsequently recovering a major portion of the unconverted organotin compound.

Films of various metal oxides are applied to glass containers to improve their impact and abrasion resistance. The oxide provides a hard, durable coating on the outer surface of the container that resists scratching. Metal oxides have also been employed to form transparent decorative or electroconductive coatings on glass. Conductive coatings are particularly useful in the electronics industry.

It is well known that thin coatings of stannic oxide, a preferred glass coating material, can be applied to glass surfaces by exposing the heated glass to a vaporized tin compound. The tin compound is often applied shortly after the glass has been shaped, and the temperature of the glass is between 700° and 1500° F. At these temperatures the tin compound is converted to stannic oxide almost immediately upon coming in contact with the heated glass. The tin compound can be applied to the glass as a vapor or as a finely divided spray containing a solubilized tin compound.

A number of organic and inorganic tin compounds have been disclosed as suitable precursors which decompose readily to stannic oxide when applied to heated glass articles, particularly containers. U.S. Pat. No. 3,420,693 teaches that the decomposable tin compound can be either organic or inorganic. This class is so broad as to encompass compounds that are less than satisfactory for one or more of a number of reasons discussed in this specification.

The tin compounds disclosed in U.S. Pat. No. 3,414,429, which also concerns a method for applying metal oxide coatings for glass containers, include inorganic stannic halides, such as stannic chloride, and organotin derivatives of carboxylic acids that preferably contain more than eight carbon atoms. The inorganic stannic halides hydrolyze readily in the presence of trace amounts of moisture present in ambient air to form highly corrosive products. Special precautions must be exercised to minimize the health hazards to personnel operating the coating equipment. Since only a small percentage of the tin compound introduced into the coating chamber actually appear on the final product and the instability of the halides make it difficult, if not impossible, to effectively recover and recycle the remaining portion, the halides are considered inefficient for use as coating precursors when evaluated on a cost-performance basis.

Organotin derivatives of carboxylic acids are less than satisfactory coating precursors because of their tendency to decompose to stannic oxide and the corresponding acid at the temperatures encountered in the coating chamber. As previously disclosed, preferred acids contain more than eight carbon atoms, and are solid at ambient temperature. Once outside of the coating chamber, the acids would tend to solidify and deposit in the cooler portions of the glass coating equipment. In addition to the maintenance required to remove the accumulated acid, these materials burn readily and therefore present a considerable fire hazard.

The broad teaching of the aforementioned U.S. Pat. No. 3,420,693 encompasses compounds that for one reason or another are unsuitable precursors for use in the "hot end" coating of glass. Some organotin compounds containing 2 or 3 carbon atoms are so toxic or have such objectionable odors as to make their use impractical, particularly in a commercial scale glass coating process. Other tin compounds do not yield acceptable coatings for reasons that are not completely understood.

Many organotin compounds, including the aforementioned carboxylic acid derivatives, exhibit a low tin content when compared to inorganic stannic halides such as stannic chloride. Relatively large amounts of these compounds would therefore be required to deposit a given weight of tin oxide, thereby increasing processing costs.

It is an objective of this invention to provide an economically efficient process for the "hot end" coating of glass with stannic oxide. A second objective is to provide a method for recovering and recycling that portion of the organotin compound not converted to stannic oxide.

It has now been found that butyltin trichloride can be pyrolyzed to provide acceptable stannic oxide coatings on heated glass surfaces. The unreacted portion of the tin compound can then be combined with water to form a solution from which the organotin compound is easily recovered by the addition of certain inorganic salts.

SUMMARY OF THE INVENTION

This invention provides an improved method for applying a coating of stannic oxide to a heated glass article by (1) contacting at least one surface of the glass article with vaporized or finely divided butyltin trichloride, whereupon the tin compound is pyrolyzed to stannic oxide, and (2) isolating and recovering the unpyrolyzed tin compound.

DETAILED DESCRIPTION OF THE INVENTION

The invention can be more clearly understood by referring to the accompanying drawing (FIG. 1), which is a diagramatic flow sheet depicting the various steps involved in the present method for coating glass articles.

Liquid butyltin trichloride, which is stored in a suitable air-tight reservoir, (1) flows into a heated chamber (2) wherein vaporization of the halide occurs. The flow of organotin compound to the heated chamber is controlled by means of a suitable valve pump or gate (not shown). The temperature within the heater is maintained at approximately 150° C. The spray of finely divided organotin compound is entrained in an air stream generated by a fan (3) and enters the coating chamber (4). The flow rate of the air stream is between 25 and 50 cubic feet per hour. A portion of the butyltin trichloride contacts the heated glass container (5) or other article in the coating chamber. The glass articles are transported into and out of the coating chamber by means of a suitable conveyor (not shown). The surface of the glass article is at a temperature of between 450° and 600° C. At these temperatures the tin compound which contacts the surface of the glass is converted to stannic oxide. A mixture of air and the unpyrolyzed butyltin trichloride is drawn out of the coating chamber by means of a blower (not shown) through an exit duct (6) which contains an electrostatic precipitator (7) or other suitable device for separating gasses from liquid and solid materials. The gas stream passes through an exhaust passage (8) and is discharged into the atmosphere. The solid and liquid components leaving the coating chamber are recovered in a suitable receiver (9). Means for returning the recovered material to the reservoir may optionally be included, as indicated by the broken lines in the drawing.

The glass articles are transported through the coating area by means of a suitable conveyor. Preferably, the glass articles are coated shortly after being shaped and prior to being placed in the annealing lehr. The temperature of the articles in the coating area is above the pyrolysis temperature of butyltin trichloride, preferably between 450° and 600° C. The residence time of each article in the coating area is sufficient to deposit an oxide film that is about 500 millimicrons in thickness. Thicker coatings are undesirable since they cause the glass to assume an iridescent appearance.

In many glass treating processes, such as that described in U.S. Pat. No. 3,498,825, applying a film of stannic oxide is only the first step of a two-step process. After being coated with stannic oxide the glass articles are sent through an annealing lehr wherein they are gradually cooled to a temperature of about 204° C. at which time a thin film of natural wax or a synthetic polymer is applied. The polymer coating is usually transparent and renders the glass highly resistant to scratches and abrasions even after being treated with caustic solutions.

Surprisingly it has been found that when a coating of natural wax or synthetic organic polymer is applied over a film of stannic oxide prepared in accordance with the present method, the coefficient of friction exhibited by the coated glass is significantly lower than can be achieved by applying the oganic coating to a stannic oxide film prepared using other organic or inorganic tin compounds, as will be demonstrated in the accompanying examples. Since the final coating is the same, one would expect the coefficient of friction to be the same, however, experimental data disclosed in the accompanying examples indicate otherwise. One possible explanation for this difference is that since the coatings are so thin, the uniformity of the initial stannic oxide coating affects the uniformity of the final coating, which is, in turn, directly related to the coefficient of friction of the final surface. If there is a difference in the uniformity of the stannic oxide coatings, this would be apparent in the extent to which the glass is strengthened by the coating. A series of tests summarized in the accompanying examples demonstrated a difference in the resistance to bursting between glass containers coated using butyltin trichloride, the compound of this invention and containers coated using dimethyltin dichloride, an organotin compound disclosed in U.S. Pat. No. 2,614,944 and Japanese Pat. No. 47-14592. The data demonstrate that glass containers coated using butyltin trichloride were considerably more resistant to bursting at pressures up to 22 kg/cm$^2$ than containers coated using dimethyltin dichloride. If burst strength and coefficient of friction are both directly related to coating uniformity, one would expect containers coated with butyltin trichloride to have the lower coefficient of friction, which was found to be true.

Among the synthetic polymer coatings that can be applied to the glass articles are polyethylene, oxidized polyethylene, copolymers of a polyoxyalkylene or etherified polyoxyalkylene and a dialkylpolysiloxane such as dimethylpolysiloxane, copolymers, including those described in U.S. Pat. No. 3,554,787, wherein the major constituent is a vinyl ester such as vinyl acetate or an ester of an unsaturated acid, such as ethyl acrylate; vinyl alcohol polymers, including those disclosed in U.S. Pat. No. 3,352,707, polyurethanes, including those described in U.S. Pat. No. 3,407,805 and maleic anhydride copolymers, including those described in U.S. Pat. No. 3,598,632. The organic coating composition is usually applied as the glass articles emerge on a conveyor from the "cold" end of the annealing lehr using any suitable means such as traversing spray nozzles. The coating is applied as a solution or emulsion at a rate of between 0.5 to 5 quarts for each 1000 sq ft of conveyor that passes in front of the spray nozzles.

Another advantage that distinguishes butyltin trichloride from other tin compounds that have been employed to deposit stannic oxide films on glassware is the relative ease with which the unreacted compound can be recovered from the coating chamber. Only about 5% or less of the organotin compound that passes into the coating area is actually converted to stannic oxide. The present state of the art makes no provision for recovering the unconverted tin compounds. This is understandable, since one class of compounds frequently employed for this purpose, namely the stannic halides, are readily hydrolyzed in the presence of even trace amounts of moisture to form corrosive products that would be difficult to recover. Other precursors disclosed by the prior art are corrosive liquids or semi-solid materials which are not suitable for conventional recovery methods. In accordance with present practice, the unconverted tin compounds are usually vented to the atmosphere together with the gas stream employed to transport the vaporized tin compound.

Butyltin trichloride is not readily hydrolyzed by water. This is an advantage in the coating of glass containers, since in some instances it is desirable to maintain the area of the container adjacent to the orifice free from deposits of stannic oxide. One method for achieving this objective is to envelope the area to be protected in an air stream known in the art as "finish air" while the container is exposed to a vaporized tin compound in the coating chamber. Since it is difficult to remove the last traces of moisture from the finish air stream, employing the present butyltin trichloride in such a process would be a considerable economic advantage, since there are no appreciable losses due to hydrolysis of the compound.

The following examples demonstrate preferred embodiments of the present invention and the improvements which distinguish the present method over conventional process for the "hot end" coating of glass articles.

EXAMPLE 1

A film of liquid butyltin trichloride was applied to one surface of heated glass plates measuring 2 × 3 inches (5 × 8 cm.) by exposing each plate for 3 seconds to a finely divided spray of the organotin compound eminating from the orifice of an atomizer. The plates were located at a distance of 1 foot (30 cm.) from the orifice. The atomization was accomplished using compressed air at a flow rate of between 7500 and 8000 cc. per minute. Just prior to being sprayed the plates were heated for ten minutes in a furnace maintained at a temperature of 900° F. (480° C.). The coated plates were heated to a temperature of 250° C. for five minutes to convert the butyltin trichloride to stannic oxide. Before the plates had an opportunity to cool to ambient temperature (about 210° C.) they were sprayed with an aqueous emulsion prepared by diluting with 980 parts of water a mixture containing 4.2 parts of an oxidized polyethylene (Polyethylene 629, available from Allied Chemical Company), 0.75 part of a mixture of fatty acids commonly referred to as "tall oil fatty acids", 0.75 part of morpholine and 14.3 parts of water. The emulsion was applied using the same procedure described for applying the butyltin trichloride, with the exception that each plate was exposed to the spray for 5 seconds. After cooling to ambient temperature the coated plates were immersed for two minutes in a 4% by weight aqueous solution of sodium hydroxide maintained at a temperature of 60° C. ± 4°. This treatment is equivalent to the washing cycle used commercially for glass soft drink bottles.

EXAMPLE 2

A number of 2 × 3 inch glass plates were coated with stannic oxide using the procedure of Example 1. In this instance the tin compound was stannic chloride which was applied using an atomizer with dichlorodifluoromethane as the propellant in place of a compressed air stream. After being heated at 250° C. for five minutes the plates were coated with oxidized polyethylene as described in the preceding example and immersed for two minutes in a 4% by weight aqueous sodium hydroxide solution at a temperature of 60° ± 4° C.

EXAMPLE 3

The coefficient of friction of the coated plates prepared as described in Examples 1 and 2 was measured using a commercially available tester manufactured by Visco Tech Company and the procedure specified by the American Society for Testing of Materials (Test No. D1894-63). The plate to be evaulated was placed coated side up, on a motor-driven movable table and secured using adhesive tape. A metal plate weighing 192 grams was placed on top of the plate and connected to a force gauge which was in turn secured to a nonmovable portion of the tester. A 100 gram weight was placed on top of the metal plate, making the total weight(W) on the glass plate 292 grams. The table was moved in a direction away from the force gauge at a rate of 15.2 ± 0.3 cm. per minute and the reading on the gauge recorded as the force (F) in grams, required to overcome the friction between the glass and metal plates. This frictional force resisted the movement of the metal plate and additional weights over the surface of the coated slide.

The coefficient of friction ($C_f$) was calculated using the formula $$C_f = F/292$$

wherein F represents the average reading of the force gauge observed during passage of the metal plate over the coated glass plate.

The average coefficient of friction for 12 plates wherein the stannic oxide coating was prepared using stannic chloride as described in Example 2 was 0.199. The average coefficient of friction for the 12 plates coated with stannic oxide derived from butyltin trichloride was 0.123. The lower coefficient of friction exhibited by glass surfaces coated in accordance with the present method is advantageous for those applications wherein a number of articles, such as containers, are maintained in contact with one another. A lower coefficient of friction increases the resistance to abrasion and scratching during handling, processing and shipping of the containers, thereby decreasing the likelihood of breakage. This makes it possible for conveying and filling machines to process a larger number of bottles in a given amount of time by spacing the bottles closer together and operating the conveying apparatus at a higher speed, even though this increases the frequency and duration of contacts between the containers and other surfaces without excessive breakage.

EXAMPLE 4

This example demonstrates that glass containers coated using butyltin trichloride exhibit a higher burst strength than containers coated using a prior art organotin compound, dimethyltin dichloride.

The burst strength evaluation was conducted by placing the interior of a number of identical containers under a gradually increasing pressure of from 12 to 22 kg per $cm^2$ and observing the percentage of bottles which burst at a given pressure. The test employed two groups of 260 bottles each. One group of containers was coated using dimethyltin dichloride and the second was coated using butyltin trichloride. The conditions employed during the coating operation were adjusted to achieve coatings of substantially equal thickness irrespective of the precursor employed. The coated bottles were heated to convert the organotin halide to stannic oxide.

The results of the burst strength evaluation are summarized in the following table:

| Pressure ($kg/cm^2$) | % of Bottles Ruptured | |
|---|---|---|
| | Dimethyltin Dichloride | Butylin Trichloride |
| 12 | 7.1 | 0 |
| 13 | 17.9 | 2.8 |
| 14 | 25 | 8.3 |
| 15 | 42 | 13.9 |
| 16 | 50 | 19.4 |
| 18 | 71.4 | 33.3 |
| 20 | 85.7 | 52.8 |
| 22 | 89.3 | 69.4 |

The results of this test demonstrate that not only was butyltin trichloride more efficient and easier to use than dimethyltin dichloride, but the former also yielded a coating which strengthened glass considerably more than coatings applied using dimethyltin dichloride.

What is claimed is:

1. In a method for applying a coating of stannic oxide to a glass surface by contacting the surface with a finely divided liquid tin compound while maintaining the glass surface at a temperature of between 450° and 600° C., whereupon the tin compound is pyrolyzed to form stannic oxide, the improvements which reside in (1) employing monobutyltin trichloride as the tin compound and (2) isolating and recovering the unpyrolyzed monobutyltin trichloride for subsequent reuse in accordance with said method.

2. A method as described in claim 1 wherein the isolation and recovery of the unpyrolyzed butyltin trichloride is effected by combining the compound with water to form an aqueous solution and subsequently separating said compound from the aqueous solution.

* * * * *